C. R. HARDY.
Car Coupling.

No. 80,730.  Patented Aug. 4, 1868.

Witnesses.  Inventor

United States Patent Office.

CLINTON R. HARDY, OF LEXINGTON, INDIANA.

Letters Patent No. 80,730, dated August 4, 1868.

IMPROVED CAR-COUPLING.

The Schedule referred to in these Letters Patent and making part of the same.

TO ALL WHOM IT MAY CONCERN:

Be it known that I, CLINTON R. HARDY, of Lexington, in the county of Scott, and State of Indiana, have invented a new and useful Improvement in Car-Couplings; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention has for its object to furnish a simple, convenient, strong, safe, and reliable car-coupling, which shall at the same time be so constructed and arranged as to uncouple itself should one or more cars of the train be overturned or thrown from the track.

It consists in the construction and combination of the various parts of the coupling, as hereinafter more fully described.

Figure 1:
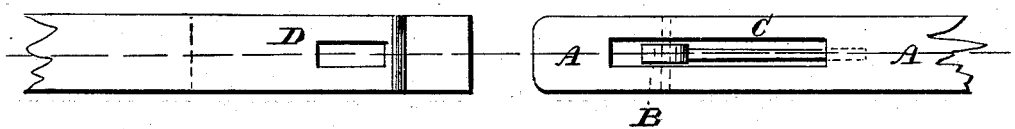
Figure 1 is a side view of my improved car-coupling detached.
Figure 2:
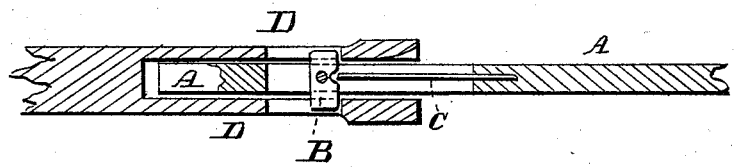
Figure 2 is a horizontal section of the same, taken through the line x x, fig. 1, showing it coupled.
Figure 3:
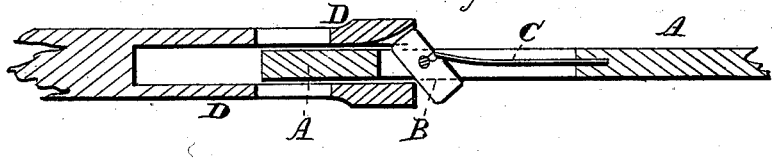
Figure 3 is the same view as fig. 2, showing the coupling-bar in the act of coupling.

A is the coupling-bar, in which, near its end, is formed a long slot, in the forward part of which slot is pivoted a block, B, by a pin or bolt or passing through the edges of the bar A, and through the centre of the block B, as shown in figs. 1, 2, and 3.

C is a spring, the rear end of which is secured in the rear part of the slot in the bar A, in such a position that its forward end may rest in a notch in the centre of the rear side edge of the block B, so that when the said block B is left free, the said spring C may always bring it into and hold it in a position at right angles to the length of the bar A.

D are two parallel spring-bars, the rear ends of which are attached to the draught-bar of the car, and which project forward at a distance apart equal to the thickness of the coupling-bar A, so that they may receive the said bar between them.

The springs D are mortised horizontally, to receive the ends of the block B, to couple the cars and sustain the draught, as shown in fig. 2. The inner edge of the forward end of one of the spring-bars D is bevelled off, as shown in figs. 2 and 3, so that, as the cars are run together, and the bar A enters the space between the spring-bars D, the pivoted block B may be turned automatically into a position parallel with the length of the bar A, so as to enter the space between the springs D, in which position it is held by the pressure of the said spring-bars D, until it reaches the mortises in the said spring-bars D, when it is forced into a position at right angles to the length of the bar A, by the action of the spring C, securely coupling the cars.

The cars, when upon a line with each other, can only be uncoupled by turning the block B into a position parallel with the length of the bar A, allowing said bar to be drawn out, uncoupling the cars. But should one or more of the cars be thrown from the track by any accident, the side pressure of the bar A against one of the spring-bars D, will force the spring against which it presses so far to one side that the end of the block B will be drawn out of the mortise of the other spring, allowing the said block B to be drawn into a position parallel with the bar A, uncoupling the car or cars that have been thrown from the track from those still remaining upon said track.

If desired, the spring-bars D may be covered or encased, so as to protect them, and so as to guide the said coupling-bar A, and more surely hold it in proper position while entering the space between the spring-bars D.

Having thus described my invention, I claim as new, and desire to secure by Letters Patent—

The slotted coupling-bar A, pivoted block B, spring C, and mortised spring-bars D, with each other and with the draught-bars of the cars, substantially as herein shown and described, and for the purpose set forth.

CLINTON R. HARDY.

Witnesses:
W. H. DAVIS,
S. A. GREEN.